(12) United States Patent
Itagaki et al.

(10) Patent No.: US 9,809,217 B2
(45) Date of Patent: Nov. 7, 2017

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventors: Kenji Itagaki, Shizuoka-ken (JP); Naofumi Magarida, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/173,915

(22) Filed: Jun. 6, 2016

(65) Prior Publication Data

US 2017/0001628 A1 Jan. 5, 2017

(30) Foreign Application Priority Data

Jul. 1, 2015 (JP) .................. 2015-132770

(51) Int. Cl.
*B60W 20/00* (2016.01)
*B60W 20/17* (2016.01)
(Continued)

(52) U.S. Cl.
CPC .............. *B60W 20/17* (2016.01); *B60K 6/365* (2013.01); *B60K 6/383* (2013.01); *B60K 6/445* (2013.01); *B60W 10/02* (2013.01); *B60W 10/06* (2013.01); *B60W 10/08* (2013.01); *B60W 2550/143* (2013.01); *B60W 2710/021* (2013.01); *B60W 2710/0644* (2013.01); *B60W 2720/30* (2013.01); *B60Y 2200/92* (2013.01); *B60Y 2300/24* (2013.01); *B60Y 2300/424* (2013.01);
(Continued)

(58) Field of Classification Search
CPC ...... B60W 20/17; B60W 10/02; B60W 10/06; B60W 10/08; B60W 2550/143; B60W 2710/021; B60W 2710/0644; B60W 220/307; B60K 6/365; B60K 6/383; B60K 6/445; B60Y 2200/92; B60Y 2300/24; B60Y 2300/424; Y10S 903/91; Y10S 903/913; Y10S 903/93; Y10S 903/946

See application file for complete search history.

(56) References Cited

U.S. PATENT DOCUMENTS 5,856,709 A * 1/1999 Ibaraki .................... B60K 6/36
180/165
6,307,277 B1 * 10/2001 Tamai .................... B60K 6/26
180/65.26
(Continued)

FOREIGN PATENT DOCUMENTS

| JP | 2004-345527 A | 12/2004 |
| JP | 2011-169344 A | 9/2011 |
| JP | 5120650 B2 | 1/2013 |

*Primary Examiner* — Behrang Badii
*Assistant Examiner* — Daniel L. Greene
(74) *Attorney, Agent, or Firm* — Andrews Kurth Kenyon LLP

(57) ABSTRACT

With the control device, when the traveling state of the vehicle 1A is a specified traveling state in which greater change than a reference value of the torque upon the output portion 11 due to input to the drive wheels Dw from the road surface over which the vehicle is traveling has occurred a plural number of times within a predetermined time interval, then when the selectable one-way clutch 12 is in the locked mode it is changed over to the free mode, and when the selectable one-way clutch 12 is in the free mode it is kept in the free mode.

6 Claims, 12 Drawing Sheets

(51) Int. Cl.
  *B60W 10/06*    (2006.01)
  *B60W 10/08*    (2006.01)
  *B60W 10/02*    (2006.01)
  *B60K 6/445*    (2007.10)
  *B60K 6/365*    (2007.10)
  *B60K 6/383*    (2007.10)

(52) U.S. Cl.
  CPC .......... *Y10S 903/91* (2013.01); *Y10S 903/913* (2013.01); *Y10S 903/93* (2013.01); *Y10S 903/946* (2013.01)

(56) References Cited

U.S. PATENT DOCUMENTS

| | | | | |
|---|---|---|---|---|
| 6,336,063 | B1* | 1/2002 | Lennevi | B60K 6/28 180/65.1 |
| 8,753,240 | B2* | 6/2014 | Kato | B60K 6/365 475/5 |
| 2002/0052677 | A1* | 5/2002 | Lasson | B60K 6/365 701/22 |
| 2002/0065589 | A1* | 5/2002 | Ostberg | B60K 6/445 701/22 |
| 2002/0179047 | A1* | 12/2002 | Hoang | B60K 6/485 123/350 |
| 2008/0182710 | A1* | 7/2008 | Shibata | B60K 6/40 477/3 |
| 2009/0098970 | A1* | 4/2009 | Kimes | B60K 6/365 475/5 |
| 2010/0235063 | A1* | 9/2010 | Kawamoto | B60W 20/15 701/70 |
| 2012/0197472 | A1* | 8/2012 | He | B60K 6/105 701/22 |
| 2013/0133480 | A1* | 5/2013 | Donnelly | B60K 6/36 74/720 |
| 2013/0297126 | A1* | 11/2013 | Yamazaki | B60W 20/40 701/22 |
| 2014/0343756 | A1* | 11/2014 | Nefcy | B60W 10/023 701/2 |
| 2015/0000442 | A1* | 1/2015 | Kimes | F16D 23/02 74/335 |
| 2015/0046008 | A1* | 2/2015 | Kuwamoto | B60K 6/445 701/22 |
| 2015/0046011 | A1* | 2/2015 | Imai | B60K 6/52 701/22 |

* cited by examiner

CONTROL DEVICE FOR HYBRID VEHICLE

INCORPORATION BY REFERENCE

The disclosure of Japanese Patent Application NO. 2015-132770 filed on Jul. 1, 2015, including the specification, drawings and abstract is incorporated herein by reference in its entirety.

BACKGROUND OF THE INVENTION

Field of the Invention

The present invention relates to a control device for a hybrid vehicle to which an engine and a motor-generator are provided as sources of drive power.

Description of the Related Art

A hybrid vehicle is per se known in which a dog clutch DC3 and a one-way clutch OC3 are provided between a rotor shaft of a first motor-generator MG1 and a case C of a hybrid transaxle, and in which one engagement member of the dog clutch DC3 is connected to the one-way clutch OC3 while the other engagement member of the dog clutch DC3 is fixed to the case C (refer to Japanese patent No. 5120650 (JP-B-5120650)). With this type of hybrid vehicle, by controlling the dog clutch DC3 to be in its engaged state during high speed traveling, a state is established in which, due to the one-way clutch OC3, positive rotation of the first motor-generator MG1 is prevented while negative rotation of the first motor-generator MG1 is permitted. Since, due to this, a Hi gear locked mode which is a parallel mode to the high speed stage (Hi) is implemented, accordingly it is possible to enhance the energy efficiency during high speed traveling.

Moreover, a selectable one-way clutch is per se known that is capable of selecting either a locked mode in which, during rotation, it permits transmission of torque between two members only in a predetermined single rotational direction, or a free mode in which, during rotation, it separates transmission of torque in both directions between those two members (refer, for example, to Japanese Patent Application Publication No. 2011-169344 (JP-A-2011-169344)). Furthermore, Japanese Patent Application Publication No. 2004-345527 may be considered to have some relevance to the present invention.

Since this type of selectable one-way clutch is endowed with this type of function, accordingly it is possible to replace the dog clutch DC3 and the one-way clutch OC3 of the above described hybrid vehicle of JP-B-5120650 with such a selectable one-way clutch, which is a unitary device. In detail, it is possible to make such a selectable one-way clutch function in a similar manner to the drive device of JP-B-5120650 by fixing one of its two members to the case C, which thus serves as a fixed member, while connecting the other of the two members to the rotor shaft of the first motor-generator MG1, which thus serves as a rotating member.

In a hybrid vehicle in which the replacement described above has been performed, the rotating member of the selectable one-way clutch receives and bears the reaction torque of the engine torque outputted by the engine. Due to this, when the selectable one-way clutch is in the locked mode and thus in the state in which positive rotation of the rotating member is prevented, the state in which torque acts upon the rotating member in the positive direction continues.

However, when this hybrid vehicle travels over a road surface such as a wavelike road in which concave and convex irregularities are repeated periodically, such as a so called "wavelike road", the torque upon the output portion changes quasi periodically due to repeated increases and reductions of rotational speed being inputted from the drive wheels. Due to this periodic variation, when the rotational speed of the wheels drops, the torque of the output portion acts in the direction to reduce the engine rotational speed, and the engine rotational speed drops. And next, when the rotational speed of the wheels increases, although the torque of the output portion acts in the direction to increase the engine rotational speed, due to the inertia of the engine, the engine rotational speed does not rise immediately. Because of this, sometimes it happens that the torque upon the rotating member of the selectable one-way clutch is eliminated so that the engagement of the selectable one-way clutch is temporarily released and it rotates in reverse, and, when thereafter the engine rotational speed rises, this engagement which has been temporarily released is re-engaged. Due to this, depending upon the value of the engine torque during this re-engagement, there is a possibility that some component of the selectable one-way clutch may be damaged when its re-engagement occurs at a rotational speed that is higher than normal. Moreover, there is a possibility that wear or strange noise may be generated due to the occurrence of ratcheting, which is a phenomenon in which, without the engagement that was temporarily released being properly re-engaged, the rotating member rotates in the positive rotational direction which is the direction in which it is not supposed to rotate.

Accordingly, an object of the present invention is to provide a control device for a hybrid vehicle which, in a traveling state in which the torque of the output portion changes periodically due to varying input to the drive wheels from the road surface over which the vehicle is traveling, is capable of suppressing deterioration of components of a selectable one-way clutch and the generation of wear or strange noise due to the occurrence of ratcheting.

SUMMARY OF THE INVENTION

The control device for a hybrid vehicle according to the present invention is applied to a hybrid vehicle comprising: an engine; a motor-generator; an output portion that outputs torque to a drive wheel; a differential mechanism having a plurality of rotating elements that are differentially rotatable with respect to one another, the engine being joined to one of the plurality of rotating elements, the motor-generator being joined to another one of the plurality of rotating elements, and the output portion being joined to yet another one of the plurality of rotating elements; and a selectable one-way clutch comprising a rotating member that can receive a reaction torque of the engine and that is provided to the differential mechanism, and that can be changed over between a locked mode in which, in the state of receiving the reaction torque, it prohibits positive rotation of the rotating member while permitting negative rotation of the rotating member in the direction opposite to the positive rotation, and a free mode in which, in the state of receiving the reaction torque, it permits both the positive rotation and the negative rotation of the rotating member; wherein, if a traveling state of the hybrid vehicle is a specified traveling state in which greater change than a reference value of a torque upon the output portion due to input to the drive wheel from a road surface over which the vehicle is traveling has occurred a plural number of times within a predetermined time interval, then, when the selectable one-way clutch is in the locked mode, it is changed over to the free mode, and, when the selectable one-way clutch is in the free mode, it is kept in the free mode.

According to this control device, if the current traveling state of the vehicle is the specified traveling state in which greater change than the reference value of the torque upon the output portion has occurred the plural number of times within the predetermined time interval, then when the selectable one-way clutch is in the locked mode it is changed over to the free mode, and when the selectable one-way clutch is in the free mode it is kept in the free mode. Accordingly, it is possible to avoid the state of affairs in which the specified traveling state continues while the selectable one-way clutch is in the locked mode. Due to this, it is possible to suppress deterioration of components of the one-way clutch due to the occurrence of re-engagement which might otherwise occur during the specified traveling state, and it is possible to suppress wear and the generation of strange noises due to the occurrence of ratcheting.

As one aspect of the control device of the present invention, there may be further included a traveling state decision device that, on the basis of change of the rotational speed of the output portion, makes a decision as to whether or not the current traveling state of the vehicle is the specified traveling state. Change of the torque upon the output portion may be ascertained from change of the rotational speed of the output portion. Due to this, even without providing any device for detecting the torque of the output portion, it is possible to ascertain change of the torque upon the output portion on the basis of change of the rotational speed of the output portion. And, due to this, it is possible to determine whether or not the current traveling state of the vehicle is the specified traveling state.

In this aspect of the present invention, the traveling state decision device may calculate the difference between the current rotational speed of the output portion and a stored value of the current average rotational speed thereof, and may decide that the current traveling state of the vehicle is the specified traveling state, if it has been detected that the absolute value of this difference has become greater than or equal to a threshold value a plural number of times within the predetermined time interval. In this case, by setting the threshold value and the predetermined time interval that are used for determining whether or not the current traveling state of the vehicle is the specified traveling state, it is possible to determine in an accurate manner whether or not current traveling state is the specified traveling state in which change of the torque of the output portion has exceeded the reference value the plural number of times within the predetermined time interval.

The specified traveling state could also be a state in which the vehicle is traveling upon an unpaved road, or a state in which the vehicle is traveling upon a road surface in which concavities and convexities have been formed artificially. For example, according to another aspect of the present invention, the specified traveling state may be a state in which the vehicle is traveling upon a wavelike road having a surface upon which concavities and convexities are cyclically repeated. Whether or not the vehicle is traveling upon the wavelike road may be determined from the torque upon the output portion, or on the basis of change of the rotational speed of the output portion. Furthermore, whether or not the vehicle is traveling upon the wavelike road may be determined on the basis of the stroke of a suspension unit that supports one of the drive wheels.

The structure of the differential mechanism is not particularly limited only to including a plurality of rotating elements to each of which an engine, a motor-generator, and an output portion are joined. For example, according to still another aspect of the present invention, the differential mechanism may be provided with four rotating elements, with the motor-generator being joined to a first rotating element of the four rotating elements, the rotating member of the selectable one-way clutch being joined to a second rotating element of the four rotating elements, the engine being joined to a third rotating element of the four rotating elements, and the output portion being joined to a fourth rotating element of the four rotating elements; and, when these four rotating elements are laid out upon a velocity diagram, they may appear in the order: the first rotating element; the second rotating element; the third rotating element; and the fourth rotating element.

Moreover, according to yet another aspect of the present invention, the differential mechanism may be provided with three rotating elements, with the motor-generator and the rotating member of the selectable one-way clutch being joined to a first rotating element of the three rotating elements, the engine being joined to a second rotating element of the three rotating elements, and the output portion being joined to a third rotating element of the three rotating elements; and, when these three rotating elements are laid out upon a velocity diagram, they may appear in the order: the first rotating element; the second rotating element; and the third rotating element.

In either of the aspects of the present invention described above, the rotating element to which the engine is joined and the rotating element to which the rotating member of the selectable one-way clutch is joined are adjacent to one another upon the velocity diagram. Accordingly, when the engine is outputting torque and also the selectable one-way clutch is in the locked mode, the rotating member of the selectable one-way clutch comes to receive the reaction torque of the engine. And also the rotating element to which the output portion is joined and the rotating element to which the engine is joined are adjacent to one another upon the velocity diagram on the side opposite to that of the rotating element to which the rotating member of the selectable one-way clutch is joined. Because of this, it becomes possible for the transmission ratio of the output portion with respect to the engine rotational speed to be in a fixed state, due to the selectable one-way clutch being operated to its locked mode and positive rotation of the rotating member thereby being prohibited.

DETAILED DESCRIPTION OF THE EMBODIMENTS

Embodiment #1

Figure 1:
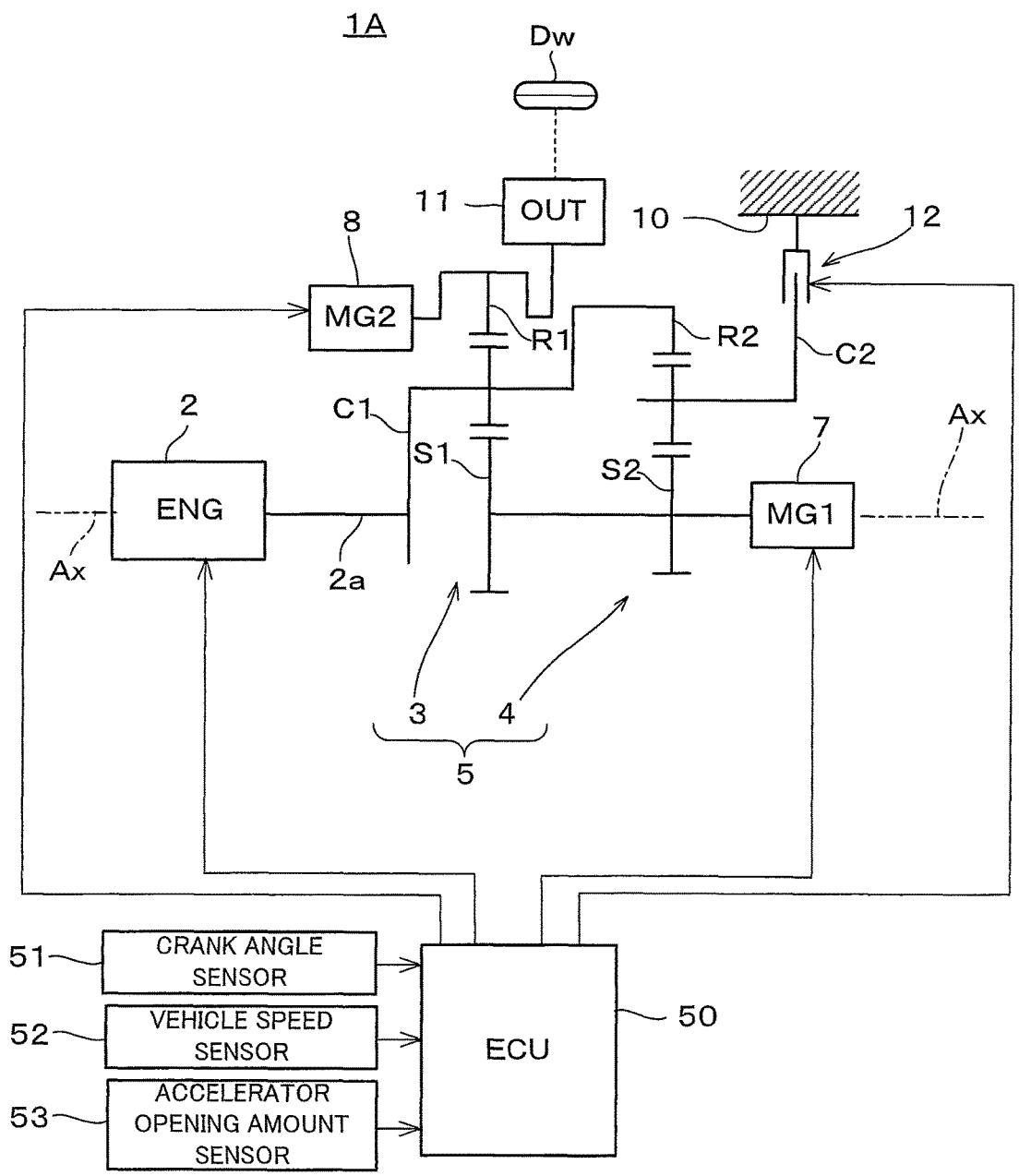
FIG. 1 is a schematic figure showing the structure of a hybrid vehicle to which a control device according to a first embodiment of the present invention has been applied.

As shown in FIG. 1, a vehicle 1A is built as a hybrid vehicle to which a control device for a hybrid vehicle according to a first embodiment of the present invention is applied. This vehicle 1A comprises a spark ignition type internal combustion engine 2 which serves as an engine, a power split mechanism 5 which serves as a differential mechanism, and two motor-generators 7 and 8. The power split mechanism 5, the motor-generators 7 and 8, and power transmission elements of various kinds are received within a casing 10.

The power split mechanism 5 is built as a combination of two planetary gear mechanisms 3 and 4 which are of the single pinion type. A sun gear S1 of the first planetary gear mechanism 3 and a sun gear S2 of the second planetary gear mechanism 4 are joined together so as to rotate as a unit, and a carrier C1 of the first planetary gear mechanism 3 and a ring gear R2 of the second planetary gear mechanism 4 are joined together so as to rotate as a unit. Due to this, four rotating elements that rotate differentially with respect to one another are defined within the power split mechanism 5. A crank shaft 2a of the internal combustion engine 2 is joined to the carrier C1. The first motor-generator 7 is joined to the sun gear S2, and the second motor-generator 8 is joined to the ring gear R1. In order to output torque to drive wheels Dw, an output portion 11 that includes a gear train and so on not shown in the figures is joined to the ring gear R1.

In this first embodiment, the sun gear S2 (and the sun gear S1) correspond to the "first rotating element" of the Claims, the carrier C2 corresponds to the "second rotating element" of the Claims, the carrier C1 (and the ring gear R2) correspond to the "third rotating element" of the Claims, and the ring gear R1 corresponds to the "fourth rotating element" of the Claims. As will be clear from the velocity diagram of FIG. 7, when these four rotating elements are laid out upon this velocity diagram, they appear in the order: the sun gear S2 (and the sun gear S1) which correspond to the first rotating element; the carrier C2 which corresponds to the second rotating element; the carrier C1 (and the ring gear R2) which correspond to the third rotating element; and the ring gear R1 which corresponds to the fourth rotating element.

Figure 2:
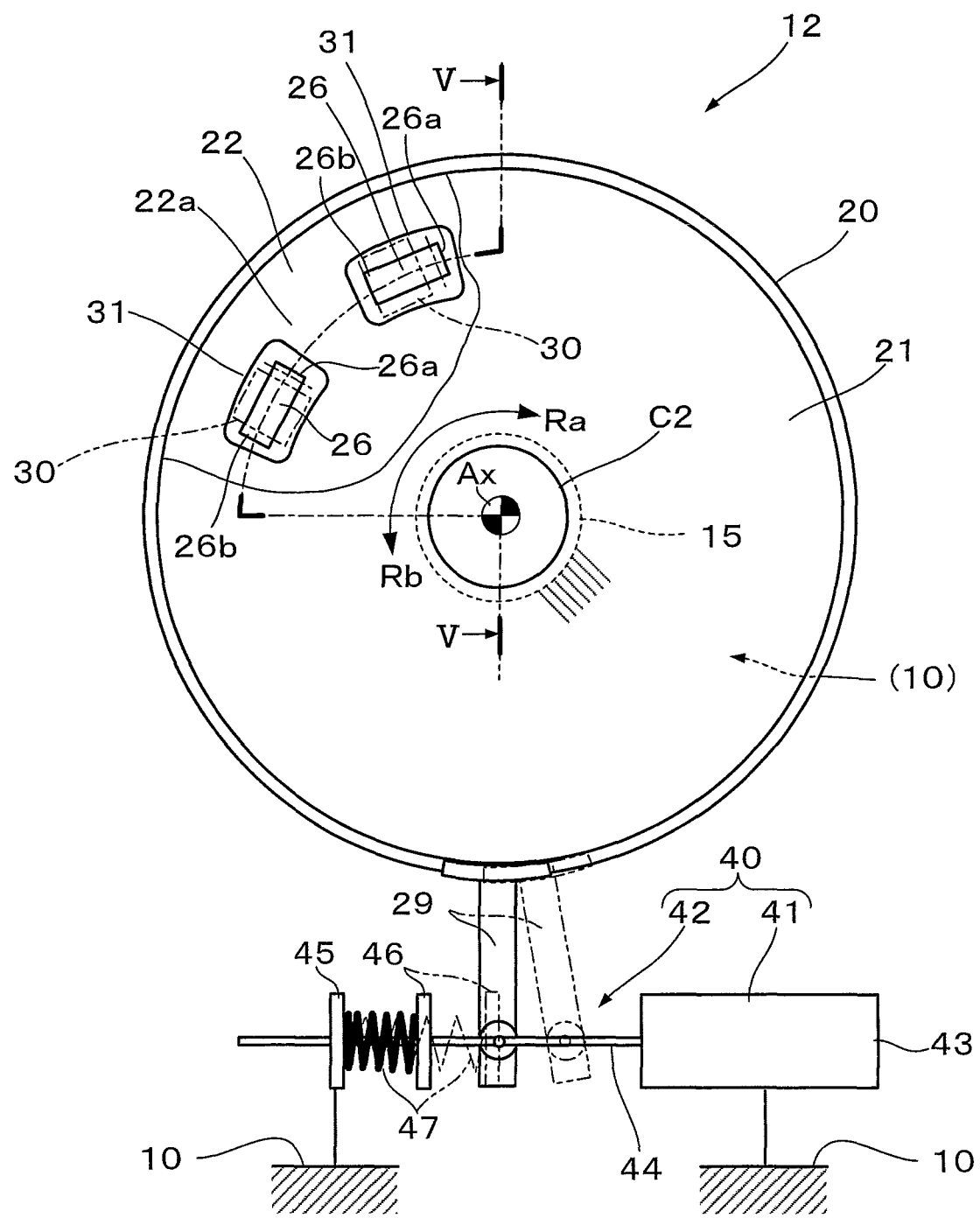
FIG. 2 is a figure showing a selectable one-way clutch that is provided to the hybrid vehicle of FIG. 1.

A selectable one-way clutch (hereinafter simply termed a "clutch") 12 is provided to the vehicle 1A. This clutch 12 is interposed between the carrier C2 of the power split mechanism 5 and the casing 10, and functions as a brake. As shown in FIG. 2, the operational mode of the clutch 12 can be selected between: a locked mode in which, when the rotational direction of the carrier C2 is the positive rotational direction Ra, the clutch 12 permits transmission of torque from the carrier C2 to the casing 10 so that the carrier C2 is in the fixed state, and, when the rotational direction is the opposite negative rotational direction Rb, the clutch 12 separates this torque transmission so that the carrier C2 is in the released state; and a free mode in which, whichever be the direction of rotation of the carrier C2, either the positive rotational direction Ra or the negative rotational direction Rb, the clutch 12 separates torque transmission from the carrier C2 to the casing 10, so that the carrier C2 is kept in the released state.

Figure 3:
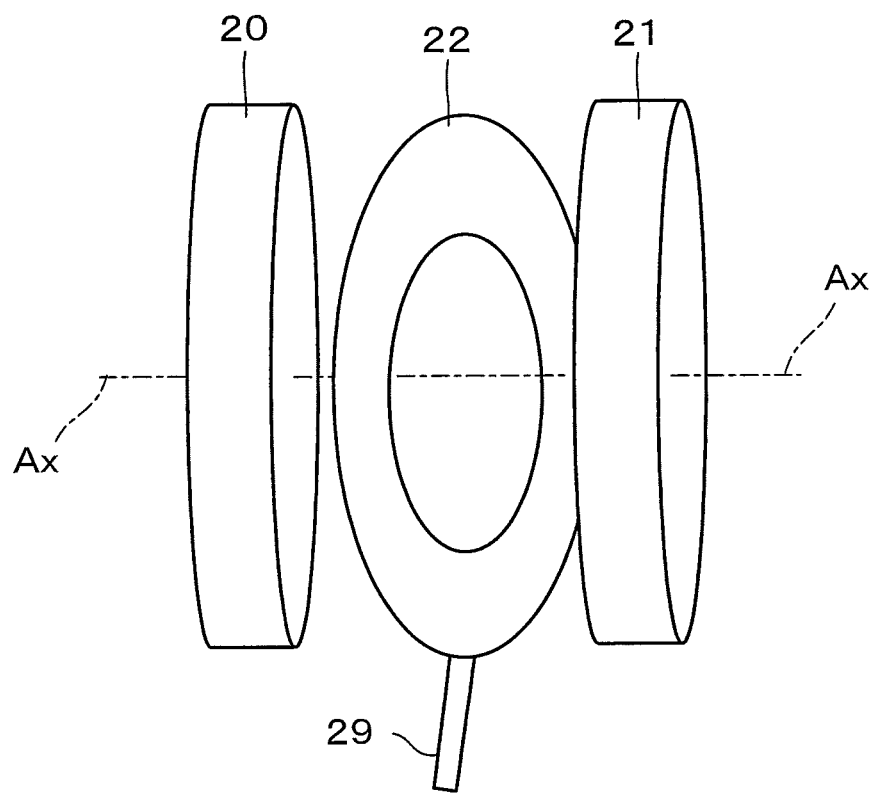
FIG. 3 is a schematic figure showing structural elements of this selectable one-way clutch.

As shown in FIG. 2 and FIG. 3, the clutch 12 comprises a hold plate 20 that is provided upon a fixed shaft 15 that is fixed to the casing 10 and that is in a state in which it is not capable of rotating around an axis Ax, a rotational plate 21 that serves as a rotating member and that is provided to the carrier C2 in a state in which it rotates integrally with the carrier C2 around the axis Ax, and a selector plate 22 that is disposed between the hold plate 20 and the rotational plate 21 and that is rotatable around the axis Ax.

Figure 4:
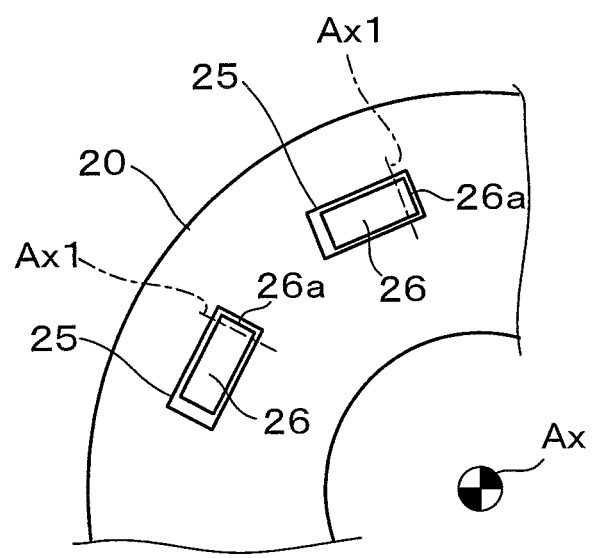
FIG. 4 is a figure showing a portion of a hold plate of this one-way clutch.
Figure 5:
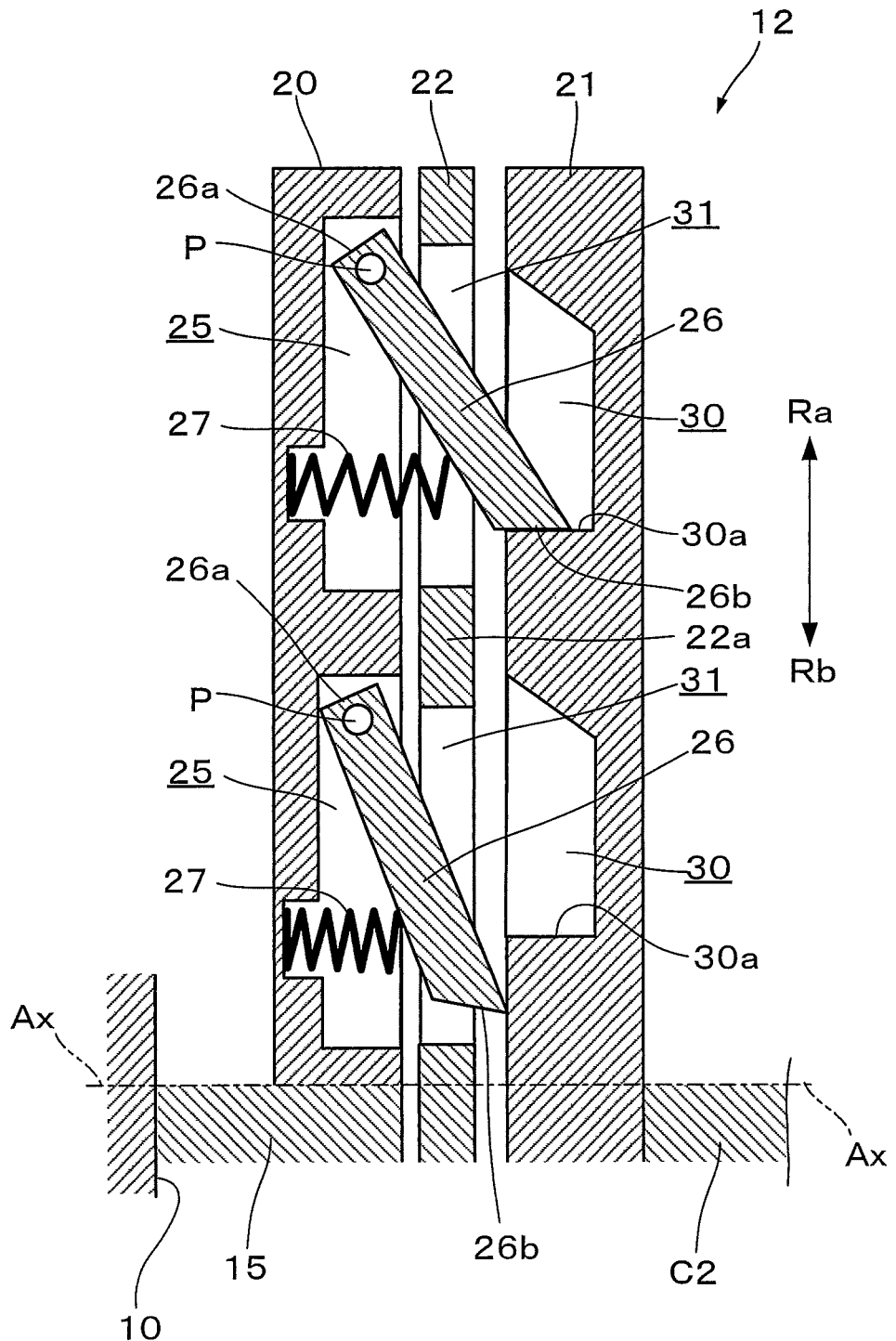
FIG. 5 is a sectional view along lines V-V of the FIG. 2 structure, shown when the clutch is in the locked mode.

As shown in FIGS. 2, 4, and 5, a plurality of holding pockets 25 are formed in the hold plate 20, and these open to the side of the hold plate 20 that opposes the rotational plate 21 and are arranged along its circumferential direction. One pawl member 26 that can engage into the rotational plate 21 is provided to each of these holding pockets 25. A base end section 26a of each of the pawl members 26 is attached to the hold plate 20 via a support shaft P that extends in the radial direction of the hold plate 20 so that the pawl member 26 is rotatable around an axis Ax1, and moreover each of the pawl members 26 is biased by a spring 27 in the direction to project toward the rotational plate 21. Due to this, each of the pawl members 26 can be operated between a state in which it is retracted toward the hold plate 20 and is received in the holding pocket 25 so that its projection therefrom is limited, and a state in which it projects from the hold plate 20 toward the rotational plate 21. In other words, each of the pawl members 26 is provided to the hold plate 20 in such a manner that it is capable of projecting therefrom.

As shown in FIGS. 2 and 5, a plurality of recesses 30 are formed in the rotational plate 21, and these open to the side of the rotational plate 21 that opposes the hold plate 20 and are arranged along its circumferential direction. Each of these recesses 30 has a wall portion 30a against which the tip end section 26b of a pawl member 26 may contact when the pawl member 26 is projected and engages with the rotational plate 21. While these features are not shown in the figures, the number of recesses 30 is greater than the number of pawl members 26, and moreover the phases of the recesses 30 and the phases of the pawl members 26 are different from one another (refer to FIG. 5). Accordingly, some (but not all) of the plurality of pawl members 26, when they are projected, can be engaged into some (but not all) of the plurality of recesses 30.

The selector plate 22 is formed with a plurality of apertures 31 that are arranged around its circumferential direction and through which portions of the pawl members 26 can pass when they are projected, and that are in phase with the pawl members 26. The rotational position of the selector plate 22 can be changed over between a lock position shown in FIG. 5 in which the pawl members 26 pass through the apertures 31 in the selector plate 22 and are capable of engaging with one or more of the recesses 30 of the rotational plate 21, and a release position shown in FIG. 6 in which projection of all of the pawl members 26 is limited due to the tip end sections 26b of the pawl members 26 coming into contact against non-formation portion 22a of the selector plate 22 in which the apertures 31 are not formed. Due to this, either the locked mode described above or the free mode of the clutch 12 can be selectively established.

As shown in FIG. 2, an operation arm 29 that extends in the radial direction is provided to the selector plate 22, and the rotational position of the selector plate 22 is changed over by this operation arm 29 being driven by a drive device 40. The drive device 40 comprises an actuator 41 and a transmission mechanism 42 that transmits the operation of the actuator 41 to the operation arm 29 of the selector plate 22. The actuator 41 includes a main body 43 that is fixed to the casing 10 and a drive rod 44 that can move forward and backward with respect to the main body 43 and that moreover is link-connected to the operation arm 29. And the transmission mechanism 42 includes a guide member 45 that is fixed to the casing 10 and that guides the drive rod 44 of the actuator 41, a spring seat 46 that is fixed to the drive rod 44, and a return spring 47 that is installed between the guide member 45 and the spring seat 46 so as to be capable of being compressed therebetween.

The state shown by solid lines in FIG. 2 is a state in which, due to the actuator 41 of the drive device 40 operating, the drive rod 44 has been projected from the main body 43 against the elastic force of the return spring 47, and the selector plate 22 has been changed over to its lock position. In this state, the clutch 12 is in the locked mode described above. On the other hand when, from the state shown in FIG. 2 by the solid lines, the actuator 41 of the drive device 40 is changed over to not operating, the drive rod 44 is retracted toward the main body 43 by the elastic force of the return spring 47, and the operation arm 29 shifts to its position shown by the double dotted broken lines, so that the selector plate 22 is changed over to its release position. Due to this, the clutch 12 is put into the free mode.

During the locked mode shown in FIG. 5, when the direction of rotation of the rotational plate 21 is the positive rotational direction Ra, the tip end section 26b of at least one of the pawl members 26 comes into contact against the wall portion 30a of one of the recesses 30. Accordingly, this pawl member 26 engages with that recess 30 of the rotational plate 21, and the hold plate 20 and the rotational plate 21 are coupled together, so that torque transmission between them becomes possible and the carrier C2 is fixed with respect to the casing 10. On the other hand, when the direction of rotation of the rotational plate 21 is the negative rotational direction Rb, since the pawl member 26 becomes tilted toward the negative rotational direction Rb, accordingly, even though the pawl member 26 does somewhat interfere with the recess 30 of the rotational plate 21, the pawl member 26 just gets pressed back by the rotational plate 21 toward the hold plate 20. Due to this, the pawl member 26 does not engage with the recess 30. Accordingly, if the clutch 12 is in the locked mode, when the direction of rotation of the rotational plate 21 is the negative rotational direction Rb, torque transmission between the hold plate 20 and the rotational plate 21 is separated, and the rotational plate 21 is released.

Figure 6:
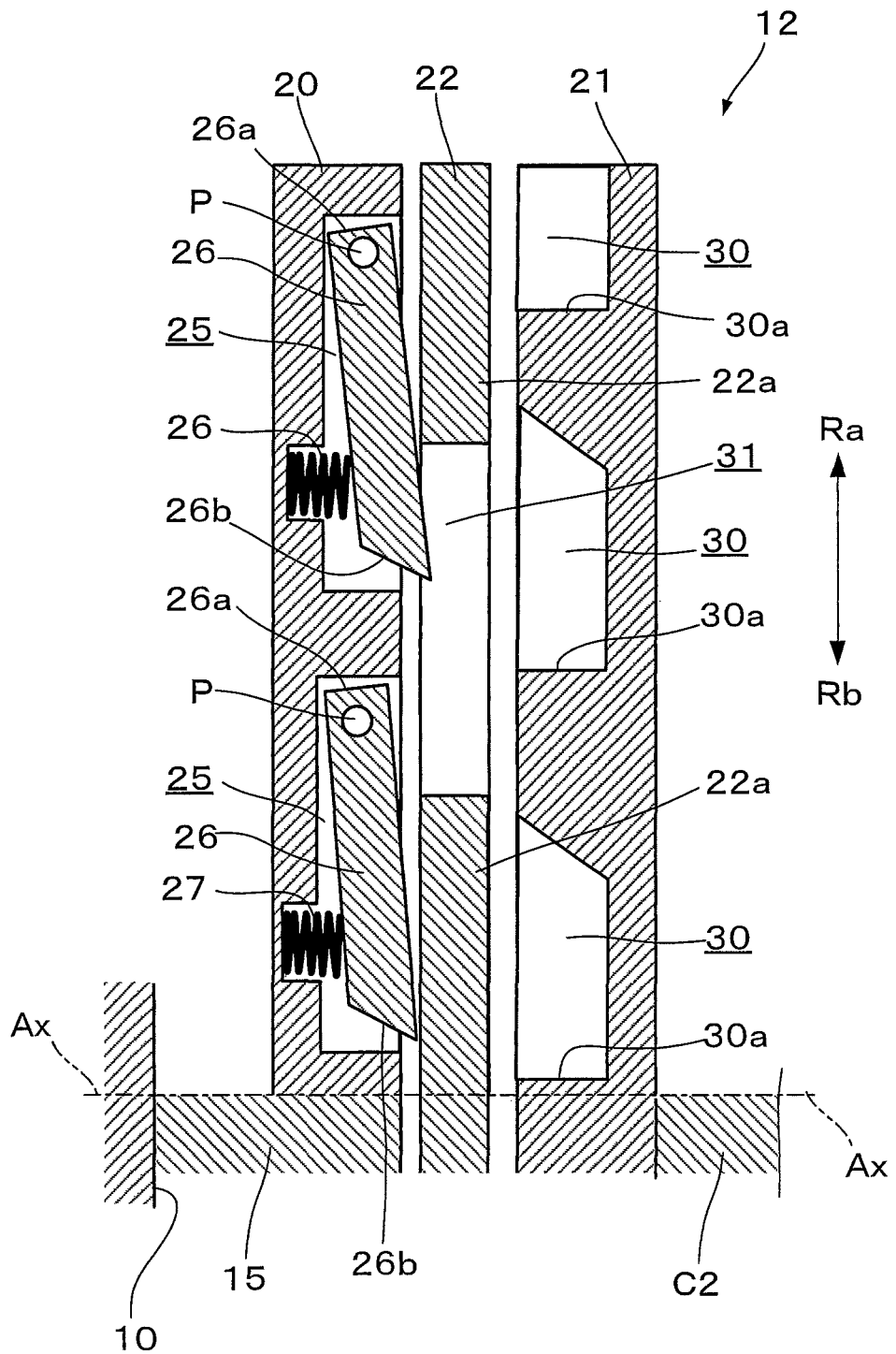
FIG. 6 is a sectional view along lines V-V of the FIG. 2 structure, shown when the clutch is in the free mode.

On the other hand, during the free mode shown in FIG. 6, the projection of all of the pawl members 26 is limited by the selector plate 22, and the pawl members 26 are kept in the state of being held back toward the hold plate 20, so that they do not reach the recesses 30 of the rotational plate 21. Accordingly torque transmission from the rotational plate 21 to the hold plate 20 is separated, whichever the direction of rotation of the rotational plate 21 may be, either the positive rotational direction Ra or the negative rotational direction Rb, so that the rotational plate 21 is released. This free mode state shown in FIG. 6 is maintained due to the elastic force of the return spring 37 described above.

The operational mode of the vehicle 1A is changed over between a fixed transmission ratio mode and a continuously variable transmission ratio mode by the operational mode of the clutch 12 being changed over between the locked mode and the free mode. During the fixed transmission ratio mode, the clutch 12 is controlled to be in the locked mode, and moreover the first motor-generator 7 is controlled to be in its shut down state in which its functioning as an electric motor and as a generator is stopped and it can free wheel. On the other hand, during the continuously variable transmission ratio mode, the clutch 12 is controlled to be in the free mode, and moreover the motor torque and the motor rotational speed of the first motor-generator 7 are controlled so that the internal combustion engine 2 is operated at a high-efficient operating point.

Figure 7:
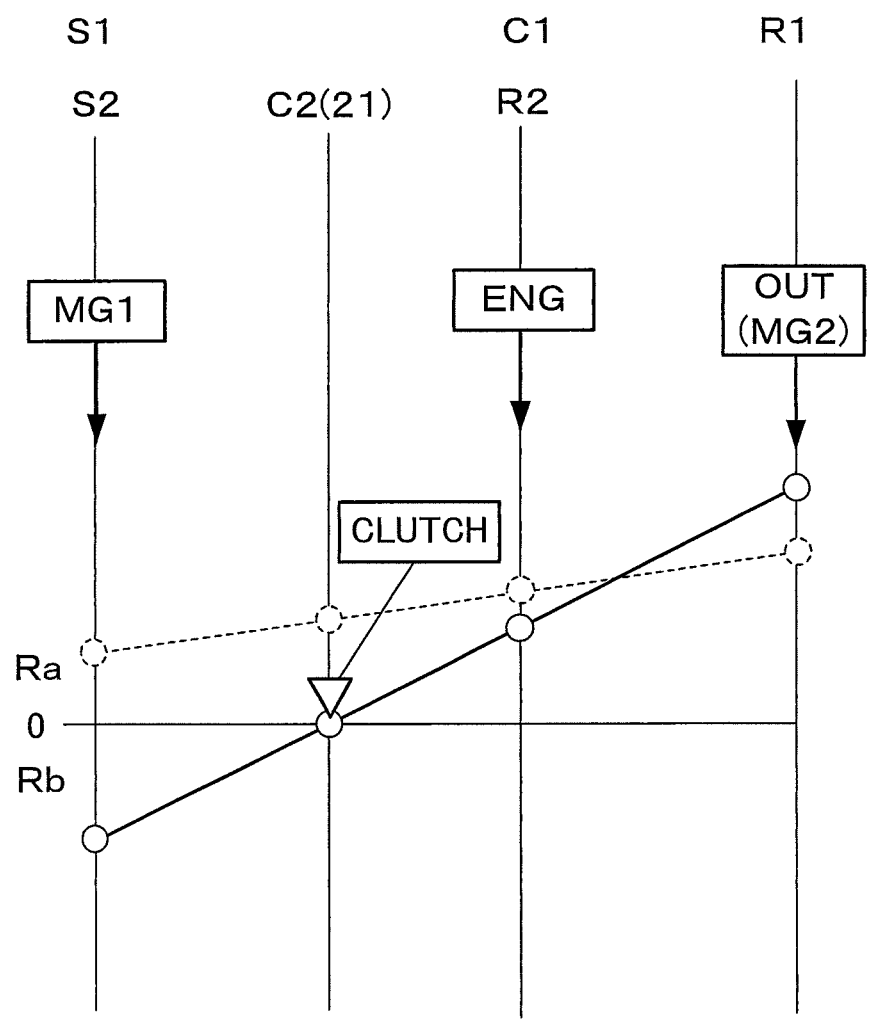
FIG. 7 is a figure showing a velocity diagram for a power split mechanism according to the first embodiment.

As shown by the solid line in FIG. 7, when the clutch 12 is in the locked mode, since the rotational plate 21 that receives the reaction torque of the internal combustion engine is prevented from rotating in the positive rotational direction Ra, accordingly, provided that engine torque is being outputted from the internal combustion engine 2 in the positive direction, the rotational speed becomes zero in the state in which this torque in the positive rotational direction Ra is acting upon the rotational plate 21. Due to this, as is clear from FIG. 7, the transmission ratio of the output portion 11 with respect to the rotational speed of the internal combustion engine 2 is uniquely determined by the gear ratio of the power split mechanism 5, so that this transmission ratio is in a fixed state. On the other hand, as shown by the broken line in FIG. 7, when the clutch 12 is in the free mode, since the rotational plate 21 is released whichever the direction of rotation of the rotational plate 21 may be, either the positive rotational direction Ra or the negative rotational direction Rb, accordingly, by controlling the motor torque and the motor rotational speed of the motor-generator 7, it is possible to change the transmission ratio of the output portion 11 with respect to the rotational speed of the internal combustion engine 2 in a continuously variable manner.

As shown in FIG. 1, changeover of the operational mode of the vehicle 1A is implemented via control of the clutch 12 by an electronic control device (i.e. an ECU) 50 that includes a computer that controls various sections of the vehicle 1A. The output signals from sensors of various types that are employed for controlling the vehicle 1A are inputted to this ECU 50. For example, the output signals from a crank angle sensor 51 that outputs a signal corresponding to the crank angle of the internal combustion engine 2, from a vehicle speed sensor 52 that outputs a signal corresponding to the speed of the vehicle 1A, from an accelerator opening amount sensor 53 that outputs a signal corresponding to the amount by which an accelerator pedal (not shown in the figures) is stepped upon, and so on may be inputted to the ECU 50.

The ECU 50 calculates the power currently being demanded for the vehicle 1A by referring to the output signals of the vehicle speed sensor 52 and of the accelerator opening amount sensor 53, and controls the vehicle 1A while changing over its operational mode appropriately for this currently demanded power. For example, in the low speed region in which the thermal efficiency of the internal combustion engine 2 is poor, the ECU 50 may change over to an electric vehicle mode in which the operation of the internal combustion engine 2 is stopped and the first motor-generator 7 and/or the second motor-generator 8 are employed as sources of power for propulsion. Moreover, in conditions in which the thermal efficiency would decrease if the demanded power were to be supplied only by engine power, or the like, the ECU 50 may change over to a hybrid mode in which the internal combustion engine 2 and the second motor-generator 8 are both employed as sources of power for propulsion.

During the hybrid mode, which of the fixed transmission ratio mode and the continuously variable transmission ratio mode is selected is set in advance according to various conditions, such as the traveling state of the vehicle 1A, the operational state of the internal combustion engine 2, the temperature of the first motor-generator 7, the electricity storage ratio of a battery not shown in the figures, and so on. For example, during implementation of the fixed transmission ratio mode, the ECU 50 may decide to change over to the continuously variable transmission ratio mode rather than continuing the fixed transmission ratio mode when some predetermined condition is satisfied such as that improvement of the system efficiency of the vehicle 1A may be anticipated or the like, and then the ECU 50 changes the clutch 12 over from the free mode to the locked mode. Due to this, the operational mode of the vehicle 1A is changed over from the fixed transmission ratio mode to the continuously variable transmission ratio mode.

As described above, when the clutch 12 is in the locked mode, the reaction torque of the engine is received and borne by the rotational plate 21. Due to this, when the clutch 12 is in the locked mode, in the state in which rotation in the positive rotational direction Ra is prevented, the state in which torque acts in the positive direction continues. In other words, the engagement of the pawl member 26 of the clutch 12 to the recess 30 is maintained. However, when the vehicle 1A is traveling over a road surface in which concavities and convexities are periodically repeated, such as for example a wavelike road, then the torque upon the output portion 11 due to input from the drive wheels Dw changes cyclically as increase and decrease of the rotational speed of the drive wheels Dw occur repeatedly. Due to this, sometimes a phenomenon such as the following takes place.

Figure 8:
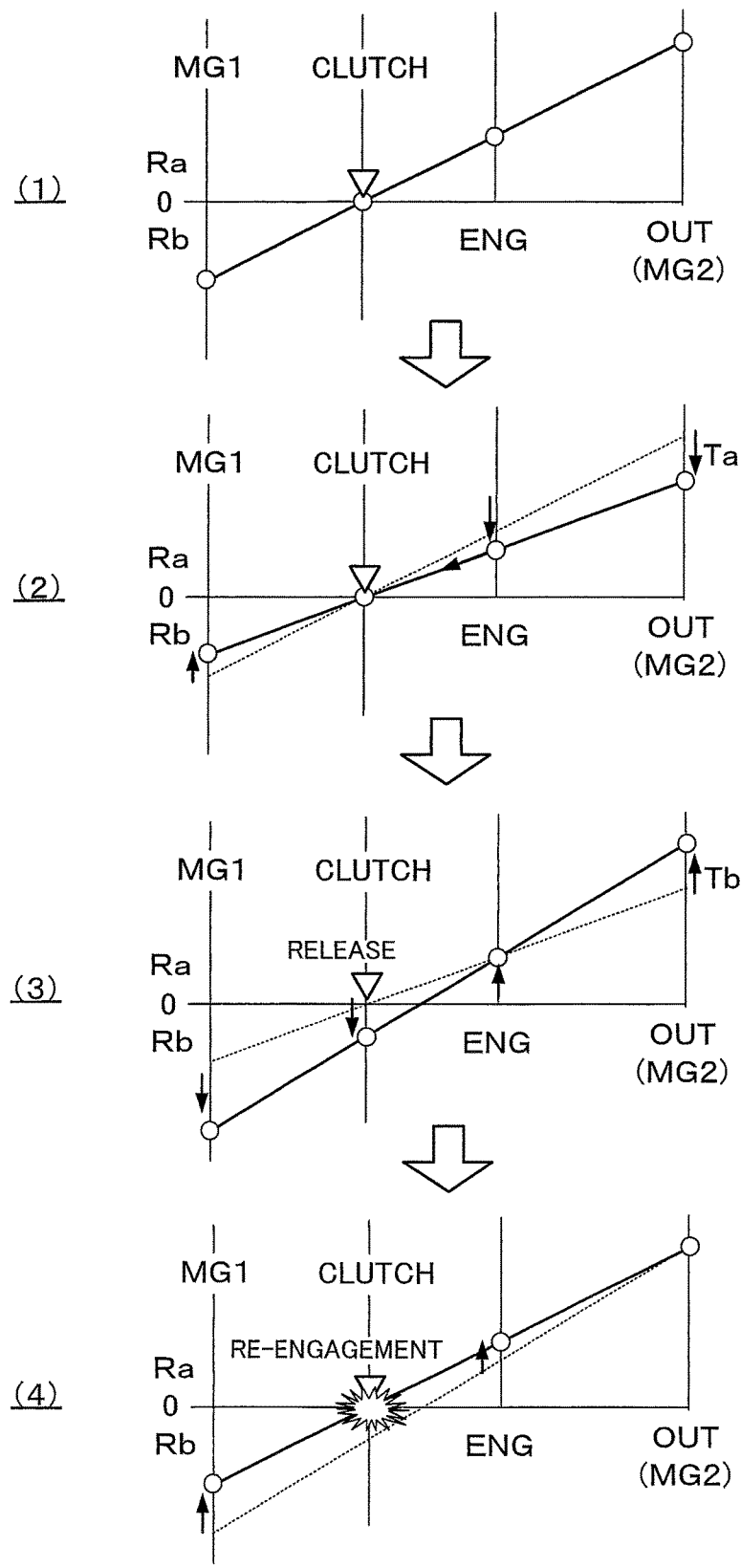
FIG. 8 is a figure in which, in a specified traveling state, changes of the states of various parts of the vehicle are shown upon a velocity diagram.

FIG. 8 shows the transitions of state of the various parts when the vehicle 1A is in a specified traveling state such as being driven along the wavelike road or the like. It should be understood that FIG. 8 shows an example when the control according to the present invention as described hereinafter is not implemented. The state (1) is a state which is the same as normal, in which, with the clutch 12 in the locked mode, the reaction torque of the engine is being received and borne by the rotational plate 21. Thereafter, in the state (2), the rotational speed of the output portion 11 is temporarily reduced by an overriding force Ta that is inputted from the drive wheels Dw. Due to this overriding force Ta, the engine rotational speed is also temporarily reduced, and also the rotational speed of the first motor-generator 7, which is in the shut down state in which it is free-wheeling in the negative rotational direction Rb, is temporarily reduced. To put it in another manner, in the state (2), the engine rotational speed temporarily drops with the rotational plate 21 of the clutch serving in the drawing like a fulcrum. It should be understood that the rotational speed of the output portion 11 may be considered as being proportional to the rotational speed of the drive wheels Dw.

And then, in the state (3), the system changes over to increase of rotational speed due to the output portion 11, which was temporarily decelerated in the state (2), inputting an overriding force Tb in the opposite direction, and accordingly the system returns to the rotational speed of the state (1). But even though, due to this overriding force Tb, a torque acts upon the internal combustion engine 2 in the direction to raise the engine rotational speed, due to the inertia of the internal combustion engine 2, the engine rotational speed does not rise immediately. Because of this, the torque upon the rotational plate 21 of the clutch 12 is cancelled, and the rotational plate 21 rotates in the negative rotational direction Rb. In other words, in the state (3), the rotational speed of the rotational plate 21 in the negative rotational direction Rb increases with the internal combustion engine 2 serving in the drawing like a fulcrum. Since the negative rotational direction Rb is the direction that eliminates the engagement between the pawl member 26 of the clutch 12 and the recess 30 of the rotational plate 21, accordingly the engagement between the pawl member 26 and the recess 30 is temporarily released.

When the rising of the rotational speed of the output portion 11 is delayed while the engine rotational speed rises so as to return to the rotational speed of the state (1), the engagement of the clutch 12 which was temporarily released is re-engaged, as in the state (4). Depending upon the engine torque during this re-engagement, the re-engagement may take place at higher rotational speed than normal, and accordingly there is a possibility that components of the clutch 12 may be deteriorated. Moreover, depending upon various conditions, in some cases it may happen that none of the pawl members 26 may be able to engage with any of the recesses 30, so that ratcheting may occur, in which the rotational plate 21 continues to rotate in the positive rotational direction Ra, although this ought not to be permitted. Since a strong frictional force is generated during such ratcheting between the pawl members 26 and the rotational plate 21, accordingly these may become severely worn, and moreover strange noises may be generated by the contact between the pawl members 26 and the rotational plate 21.

Accordingly, in order to avoid the state of affairs in which such a specified traveling state continues while the clutch 12 is in the locked mode and thus to suppress the phenomenon shown in FIG. 8, if the traveling state of the vehicle 1A is a specified traveling state such as the state of traveling along the wavelike road or the like, the ECU 50 changes the clutch 12 over to the free mode when it is in the locked mode, and moreover keeps the clutch 12 in the free mode when it is in the free mode.

Figure 9:
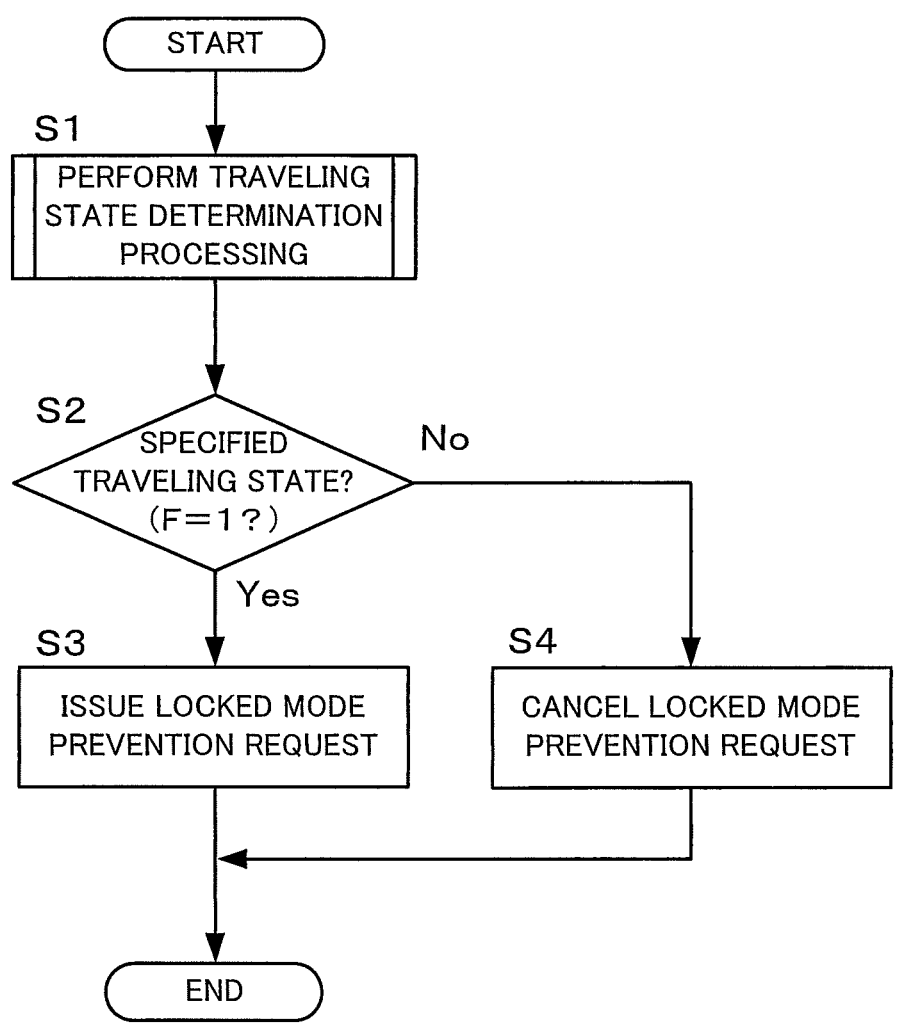
FIG. 9 is a flow chart showing an example of a control routine according to the first embodiment.

The ECU 50 performs the control described above by, for example, executing the control routine of FIG. 9. A program for the control routine of FIG. 9 is stored in the ECU 50, and is read out in a timely manner and is repeatedly executed at predetermined time intervals. First in a step S1 of FIG. 9 the ECU 50 implements traveling state determination processing, in which a determination is made as to whether the current traveling state is the specified traveling state.

Figure 10:
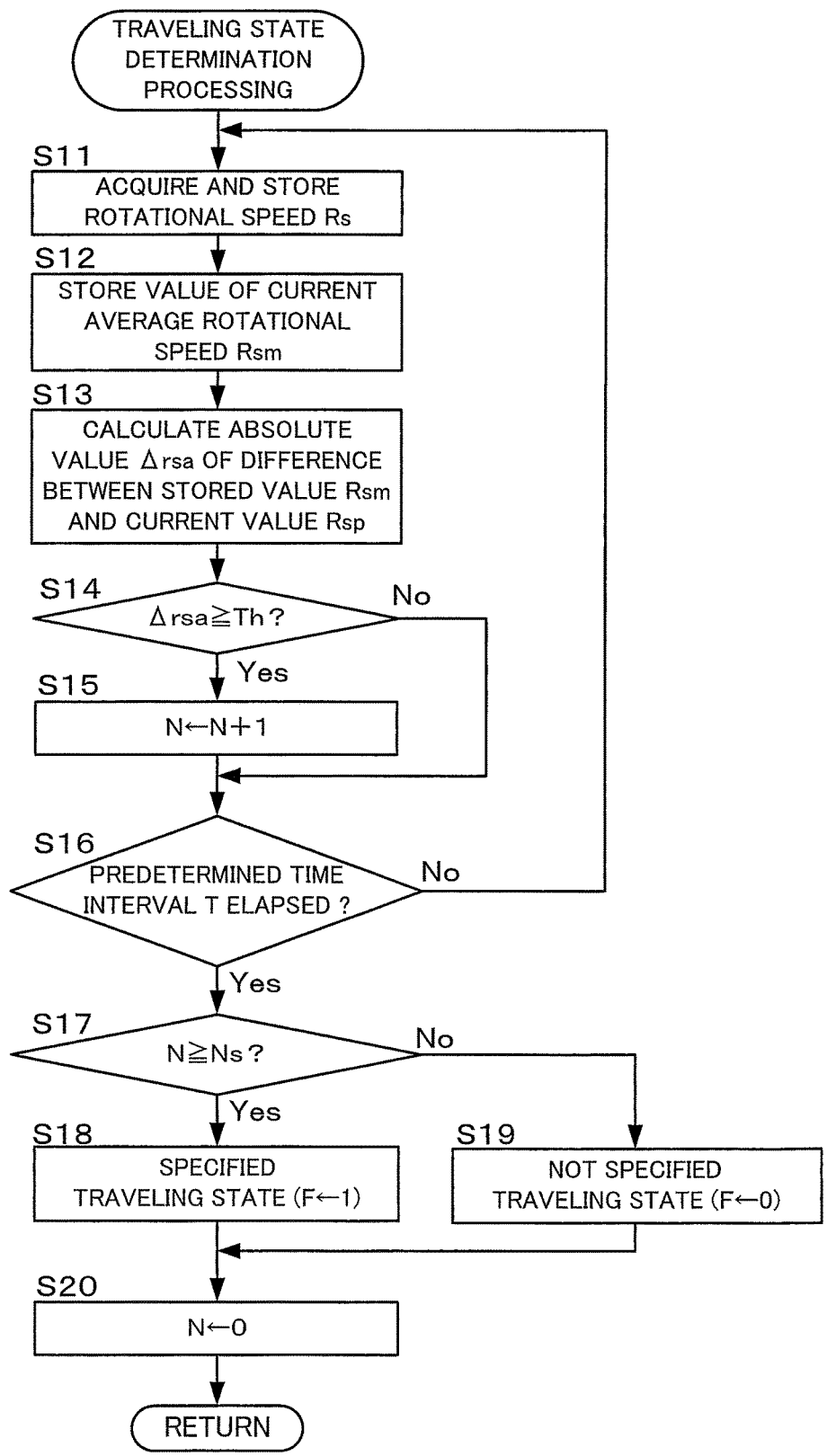
FIG. 10 is a flow chart showing an example of a subroutine of the control routine of FIG. 9.

This traveling state determination processing is shown in detail in FIG. 10. In a step S11, the ECU 50 acquires the rotational speed Rs of the output portion 11 on the basis of the output signal of the vehicle speed sensor 52, and repeatedly stores this rotational speed Rs that it has acquired. Then in a step S12 the ECU 50 calculates the average value of the rotational speed of the output portion 11 from a predetermined earlier time point, for example from 5 seconds earlier, until the present time point, and stores this average value as the stored value Rsm of the average rotational speed. This stored value Rsm is repeatedly updated every time the step S12 is executed. Then in a step S13 the ECU 50 calculates the absolute value Δrsa of the difference between the current stored value Rsm of the average rotational speed and the current value Rsp of the rotational speed Rs. And then in a step S14 the ECU 50 makes a decision as to whether or not this absolute value Δrsa that has been calculated in the previous step S13 is greater than or equal to a predetermined threshold value Th. By doing this, it is determined whether change of the rotational speed of the output portion 11 has exceeded a reference value, and furthermore, by extension, whether the change of the torque of the output portion 11 has exceeded a reference value. If the absolute value Δrsa is greater than or equal to the threshold value Th, then the flow of control proceeds to a step S15, whereas, if this is not the case, then the step S15 is skipped and the flow of control is transferred to a step S16.

In the step S15, the ECU 50 updates to N+1 the value of a variable N for managing the number of times that the absolute value Δrsa has become greater than or equal to the threshold value Th. And in the step S16 the ECU 50 makes a decision as to whether or not a predetermined time interval T (for example, 3 seconds) has elapsed, this time interval T being a reference interval for deciding whether or not the current traveling state is the specified traveling state. If the predetermined time interval T has elapsed, then the flow of control proceeds to the step S17. But if the predetermined time interval T has not elapsed, then the ECU 50 returns the flow of control to the processing of the step S11, and repeats the processing from the step S11 to the step S15 until the predetermined time interval T elapses.

In the step S17, the ECU 50 makes a decision as to whether or not the number of times that the absolute value Δrsa has become greater than or equal to the threshold value Th is greater than or equal to a reference number of times Ns which is a plural number of times (and which for example may be twice). In other words, the ECU 50 makes a decision as to whether or not the value of the variable N is greater than or equal to the reference number of times Ns. By doing this, a decision is made as to whether or not the fact that the torque change of the output portion 11 has exceeded the reference value has happened the plural number of times within the predetermined time interval T. If the value of the variable N is greater than or equal to the reference number of times N, then the flow of control proceeds to a step S18, whereas if this is not the case then the flow of control is transferred to a step S19.

In the step S18, the ECU sets a management flag F for managing the traveling state to "1", which means that the current traveling state is the specified traveling state. On the other hand, in the step S19, the ECU sets the management flag F to "0", which means that the current traveling state is not the specified traveling state. And then in a step S20 the ECU 50 clears the value of the variable N, and the flow of control returns to the main routine of FIG. 9.

In the next step S2 of FIG. 9, the ECU 50 refers to the value of the management flag F, and makes a decision as to whether or not the current management state is the specified traveling state. If the current management state is the specified traveling state, then the flow of control proceeds to a step S3. But if the current management state is not the specified traveling state, then the flow of control is transferred to a step S4.

In the step S3, the ECU 50 issues a locked mode prevention request, in order to prevent changing over of the clutch 12 to the locked mode. When this locked mode prevention request has been issued, if the current operational mode of the clutch 12 is the free mode, this free mode is maintained. In other words, when such a locked mode prevention request has been issued, even if the condition for changing over to the locked mode is satisfied, change over from the free mode to the locked mode is prevented until the locked mode prevention request is cancelled. Moreover, if at the time point that the locked mode prevention request is issued the state of the operational mode of the clutch 12 is the locked mode, then a changeover from the locked mode to the free mode is performed. Accordingly, the clutch 12 is kept in the free mode from the time point when the locked mode prevention request is issued until the time point when the locked mode prevention request is cancelled.

On the other hand, in the step S4 the ECU 50 cancels the locked mode prevention request. When the control routine of FIG. 9 has issued a locked mode prevention request in the step S3 in this manner, at the time point that it is determined that the current traveling state is not the specified traveling state, the locked mode prevention request is cancelled immediately in the step S4. However, it would also be possible not to cancel the issue of the locked mode prevention request for a predetermined time period after it has been issued, and only to cancel the locked mode prevention request at a time point at which, after this predetermined time period has elapsed, it has been determined that the current traveling state is not the specified traveling state.

According to this first embodiment, if the current traveling state is the specified traveling state, then the clutch 12 is changed over to the free mode when it is in the locked mode, and moreover the clutch 12 is kept in the free mode when it is in the free mode. Accordingly, it is possible to avoid the state of affairs in which the specified traveling state is continued while the clutch 12 is in the locked mode. Due to this, it is possible to suppress deterioration of components of the clutch 12 due to the occurrence of re-engagement which might otherwise occur during the specified traveling state, and it is possible to suppress wear and the generation of strange noises due to the occurrence of ratcheting.

In the processing of FIG. 10, the threshold value Th and the predetermined time interval T that are used in the decision as to whether or not the current traveling state is the specified traveling state are set as appropriate, on the basis of the conditions in which temporary release and re-engagement of the clutch 12 described above may occur. These conditions may be specified according to characteristics of the vehicle that are derived on the basis of testing using actual vehicle equipment, or on the basis of simulation or the like. By doing this, it is possible to determine in an accurate manner whether or not change of the torque of the output portion 11 exceeding the reference value occurs a plural number of times within the predetermined time interval.

By the ECU 50 executing the processing of FIG. 10 as defined in the step S1 of FIG. 9, it functions as the "traveling state decision device" of the Claims.

Embodiment #2

Figure 11:
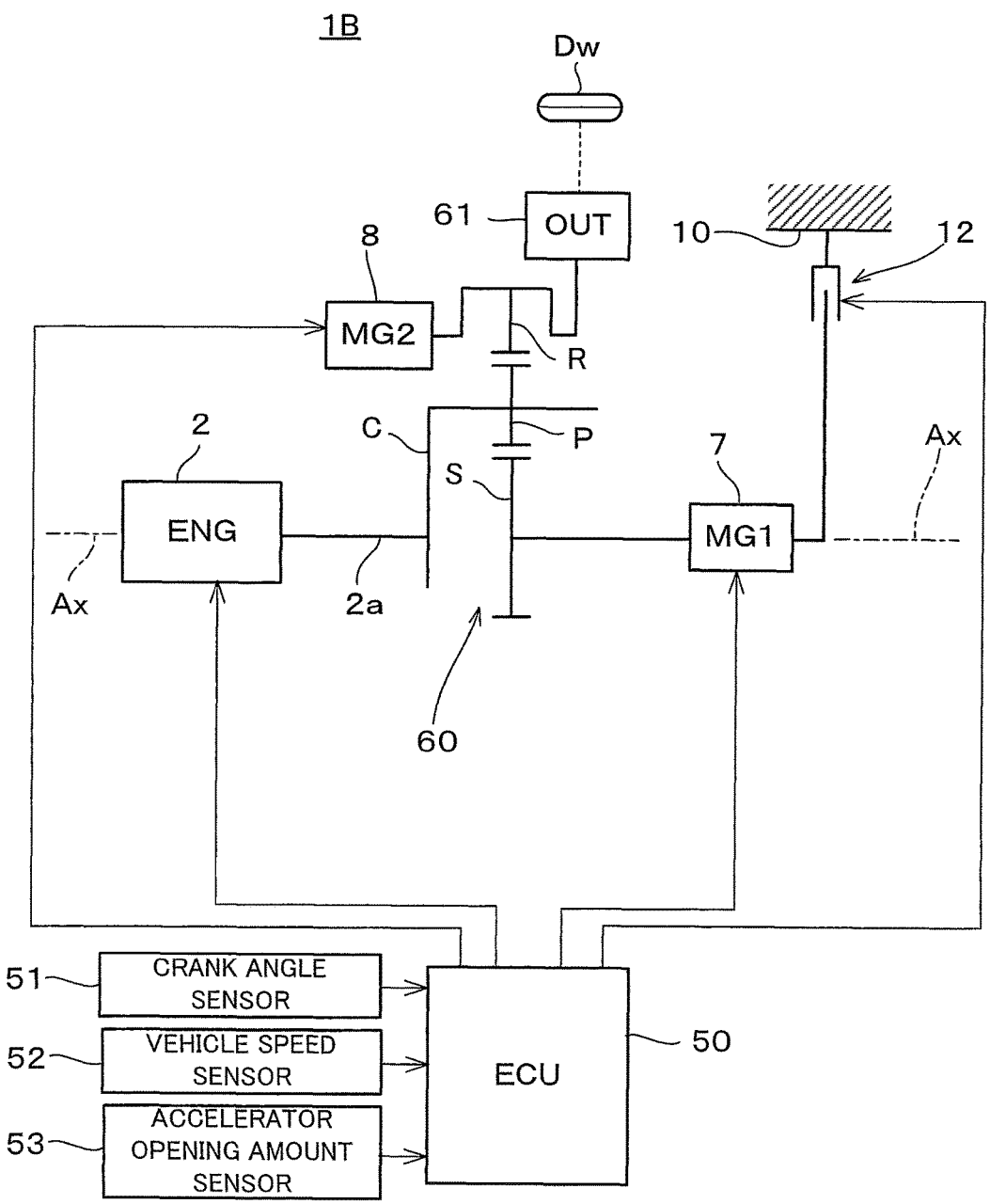
FIG. 11 is a schematic figure showing the structure of a hybrid vehicle to which a control device according to a second embodiment of the present invention has been applied.

A second embodiment of the present invention will now be explained with reference to FIGS. 11 and 12. FIG. 11 is a schematic figure showing the structure of a hybrid vehicle 1B to which a control device according to this second embodiment of the present invention has been applied. This vehicle 1B differs from the vehicle 1A of the first embodiment in that it has a different structure for the power split mechanism 60, a different structure from the power split mechanism 60 to the drive wheels Dw, and a different location for mounting of the clutch 12. Since the other structural elements of this vehicle 1B are the same as corresponding ones of the vehicle 1A, accordingly the structures which are common to this vehicle 1B and the vehicle 1A will be denoted in FIG. 11 by the same reference symbols, and explanation thereof will be curtailed.

The power split mechanism 60 is built as a single pinion type planetary gear mechanism, and comprises a sun gear S which is an externally toothed gear wheel, a ring gear R which is an internally toothed gear wheel, and a carrier C which itself rotates and which also rotatably carries a pinion P that is meshed with these gears S and R. The sun gear S, the ring gear R, and the carrier C function as three rotating elements that rotate differentially with respect to one another. A first motor-generator 7 and a rotational plate 21 of a clutch 12 that will be described hereinafter are joined to the sun gear S, an internal combustion engine 2 is joined to the carrier C, and an output portion 61 that includes a gear train and so on not shown in the figures for outputting torque to drive wheels Dw is joined to the ring gear R. In this second embodiment, the sun gear S corresponds to the "first rotating element" of the Claims, the carrier C corresponds to the "second rotating element" of the Claims, and the ring gear R corresponds to the "third rotating element" of the Claims. As will be clear from the velocity diagram of FIG. 12, when these three rotating elements are laid out upon this velocity diagram, they appear in the order: the sun gear S which corresponds to the first rotating element; the carrier C which corresponds to the second rotating element; and the ring gear R which corresponds to the third rotating element.

In the case of this second embodiment, the clutch 12 that is provided to the vehicle 1B functions as a brake that is interposed between the sun gear S and the casing 10, with a rotational plate 21 of the clutch 12 being provided to the sun gear S. In a similar manner to the case in the first embodiment, the operational mode of this clutch 12 can be selected between: a locked mode in which, when the direction of rotation of the sun gear S is the positive rotational direction Ra, the clutch 12 permits torque transmission from the sun gear S to the casing 10 so that the sun gear S is in a fixed state, whereas, when the direction of rotation is the opposite negative rotational direction Rb, this transmission of torque is separated and the sun gear S is changed over to a released state; and a free mode in which, whichever be the direction of rotation of the sun gear S, either the positive rotational direction Ra or the negative rotational direction Rb, torque transmission from the sun gear S to the casing 10 is separated and the sun gear is kept in the released state.

In this vehicle 1B, an operational mode is changed over between a motor locked mode and a motor free mode by the operational mode of the clutch 12 being changed over between the locked mode and the free mode. The changeover between these two operational modes is implemented by the ECU 50 in a similar manner to the way in which this is performed in the first embodiment. During the motor locked mode, the clutch 12 is controlled to be in the locked mode, and moreover the function of the first motor-generator 7 as an electric motor and as a generator is stopped and the first motor-generator 7 is controlled to be in the shut down state in which it can free wheel. Due to this, along with it being possible to avoid overheating of the first motor-generator 7 and so on, also it becomes possible to avoid power recirculation, which would reduce the system efficiency. On the other hand, during the motor free mode, the clutch 12 is controlled to be in the free mode, and moreover the motor torque and the motor rotational speed of the first motor-generator 7 are controlled so that the internal combustion engine 2 operates at a high efficiency operating point.

Figure 12:
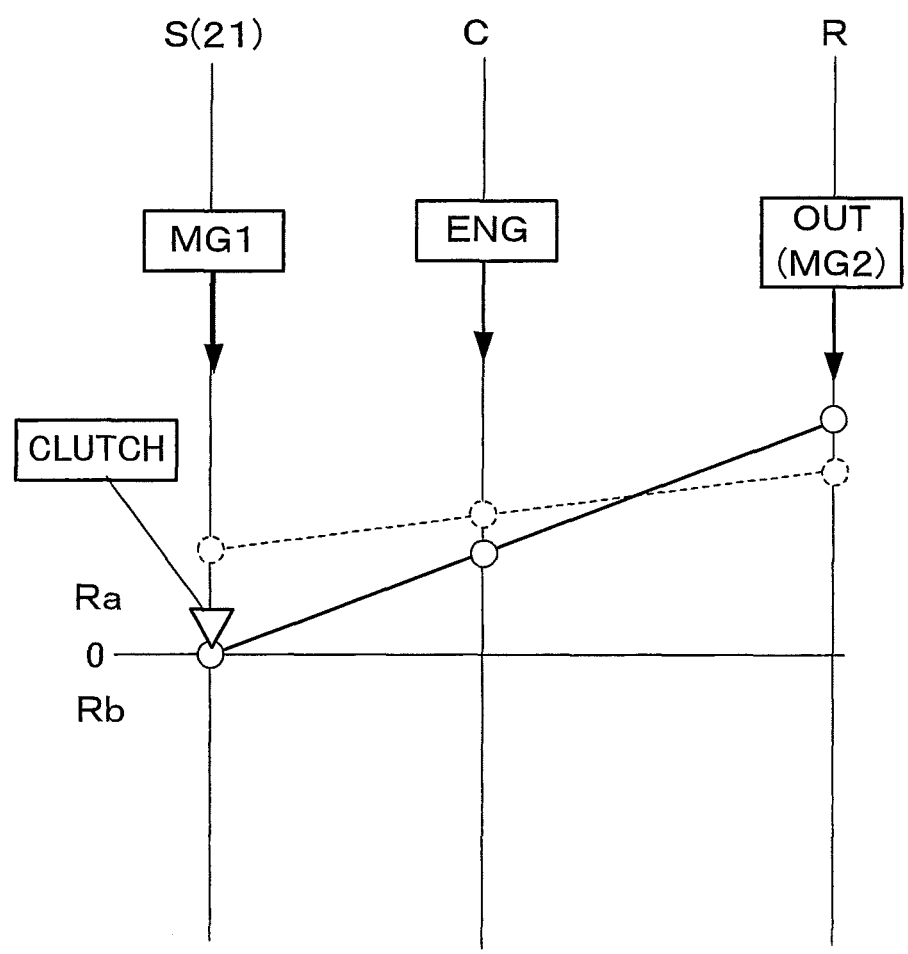
FIG. 12 is a figure showing a velocity diagram for a power split mechanism, according to this second embodiment.

As shown by the solid line in FIG. 12, since rotation in the positive rotational direction Ra of the rotational plate 21 which receives the reaction torque of the internal combustion engine 2 is prohibited when the clutch 12 is in the locked mode, accordingly, unless engine torque is being outputted in the positive direction from the internal combustion engine 2, the rotational speed in the state in which torque acts in the positive rotational direction Ra upon the rotational plate 21 becomes zero. Due to this, the transmission ratio of the output portion 61 with respect to the engine rotational speed comes to be uniquely determined by the gear ratio of the power split mechanism 60, and this transmission ratio comes to be in a fixed state. On the other hand, as shown by the broken line in FIG. 12, when the clutch 12 is in the free mode, since the rotational plate 21 is released whichever be its direction of rotation, either the positive rotational direction Ra or the negative rotational direction Rb, accordingly it is possible to vary the transmission ratio of the output portion 61 with respect to the rotational speed of the engine in a continuously variable manner by controlling the motor torque and the motor rotational speed of the first motor-generator 7.

In this second embodiment as well, a similar problem to that encountered in the case of the first embodiment arises if, during the motor locked mode, the traveling state of the vehicle 1B is the specified traveling state. Due to this, if the current traveling state is the specified traveling state, then the ECU 50 changes over the clutch 12 to the free mode when it is the locked mode, and also keeps the clutch 12 in the free mode when it is in the free mode. The control routine that is implemented by the ECU 50 in this second embodiment is the same as the control routine of FIGS. 9 and 10 for the first embodiment.

Since according to this second embodiment, in a similar manner to the case with the first embodiment, if the current traveling state of the vehicle 1B is the specified traveling state, then the clutch 12 is changed over to the free mode when it is in the locked mode, and moreover the clutch 12 is kept in the free mode if it is in the free mode, accordingly it is possible to avoid the state of affairs that the specified traveling state continues while the clutch 12 is in the locked mode. Due to this, it is possible to avoid component deterioration due to re-engagement of the clutch 12 that might otherwise take place during the specified traveling state, and it is also possible to suppress wear and/or strange noises due to the occurrence of ratcheting.

The present invention is not limited to the embodiments described above; it may be implemented in various different ways within the range of its scope. In the processing of FIG. 10 that is implemented in the embodiments described above, attention was concentrated upon the fact that it is possible to ascertain change of the torque of the output portion by change of its rotational speed, and a decision was made, on the basis of the rotational speed of the output portion, as to whether or not the current traveling state is the specified traveling state, in which the phenomenon of the magnitude of the change of the torque of the output portion exceeding the reference value occurs a plural number of times within the predetermined time interval.

However it would also be possible, for example, to install a distortion gauge to a drive shaft or the like (not shown in the figures) that is included in the output portion, and to make a decision as to whether or not the current traveling state is the specified traveling state by measuring the torque of the output portion on the basis of the output of this distortion gauge. Moreover, it would also be possible to make a decision as to whether or not the current traveling state is the specified traveling state by detecting the stroke of a suspension not shown in the figures that supports one of the drive wheels by using a stroke sensor.

While a typical example of the specified traveling state is that the vehicle is traveling along a wavelike road in which concavities and convexities of the road surface are repeated cyclically, the specified traveling state could also be that the vehicle is in the state of traveling upon an unpaved road, or that the vehicle is in the state of traveling upon a road surface upon which artificial concavities and convexities have been formed.

It should be understood that, if the ECU obtains the state of the road surface upon which the vehicle is traveling by referring to road information that is registered in, for example, a navigation system, then it would also be possible to perform the control described above by considering the state of traveling upon the wavelike road or upon an unpaved road as being the specified traveling state, on the basis of road information that has been registered in advance for the wavelike roads or for the unpaved roads. Since, in the case of an embodiment in which the ECU refers to this type of road information, it is possible to ascertain the specified traveling state in advance, accordingly there is the advantageous aspect that it is possible reliably to avoid deterioration of components due to the occurrence of re-engagement that might occur during the specified traveling state, and it is also possible to suppress wear and the generation of strange noises due to the occurrence of ratcheting.

The invention claimed is:

1. A control device for a hybrid vehicle, applied to a hybrid vehicle comprising:
   an engine;
   a motor-generator;
   an output portion that outputs torque to a drive wheel;
   a differential mechanism having a plurality of rotating elements that are differentially rotatable with respect to one another, the engine being joined to one of the plurality of rotating elements, the motor-generator being joined to another one of the plurality of rotating elements, and the output portion being joined to yet another one of the plurality of rotating elements; and
   a selectable one-way clutch comprising a rotating member that can receive a reaction torque of the engine and that is provided to the differential mechanism, and that can be changed over between a locked mode in which, in the state of receiving the reaction torque, it prohibits positive rotation of the rotating member while permitting negative rotation of the rotating member in the direction opposite to the positive rotation, and a free mode in which, in the state of receiving the reaction torque, it permits both the positive rotation and the negative rotation of the rotating member;
   wherein, if a traveling state of the hybrid vehicle is a specified traveling state in which greater change than a reference value of a torque upon the output portion due to input to the drive wheel from a road surface over which the vehicle is traveling has occurred a plural number of times within a predetermined time interval, then, when the selectable one-way clutch is in the locked mode, it is changed over to the free mode, and, when the selectable one-way clutch is in the free mode, it is kept in the free mode.

2. A control device according to claim 1, further comprising a traveling state decision device that, on the basis of change of the rotational speed of the output portion, makes a decision as to whether or not the traveling state of the vehicle is the specified traveling state.

3. A control device according to claim 2, wherein the traveling state decision device calculates the difference between a current rotational speed of the output portion and a stored value of a current average rotational speed thereof, and decides that the traveling state of the vehicle is the specified traveling state, if it has been detected that the absolute value of this difference has become greater than or equal to a threshold value a plural number of times within the predetermined time interval.

4. A control device according to claim 1, wherein the specified traveling state is a state in which the vehicle is traveling upon a wavelike road having a road surface upon which concavities and convexities are cyclically repeated.

5. A control device according to claim 1, wherein, as the plurality of rotating elements, the differential mechanism is provided with four rotating elements, with the motor-generator being joined to a first rotating element of the four rotating elements, the rotating member of the selectable one-way clutch being joined to a second rotating element of the four rotating elements, the engine being joined to a third rotating element of the four rotating elements, and the output portion being joined to a fourth rotating element of the four rotating elements; and, when these four rotating elements are laid out upon a velocity diagram, they appear in the order: the first rotating element; the second rotating element; the third rotating element; and the fourth rotating element.

6. A control device according to claim 1, wherein, as the plurality of rotating elements, the differential mechanism is provided with three rotating elements, with the motor-generator and the rotating member of the selectable one-way clutch being joined to a first rotating element of the three rotating elements, the engine being joined to a second rotating element of the three rotating elements, and the output portion being joined to a third rotating element of the three rotating elements; and, when these three rotating elements are laid out upon a velocity diagram, they appear in the order: the first rotating element; the second rotating element; and the third rotating element.

* * * * *